UNITED STATES PATENT OFFICE.

GEORGE HILLARD BENJAMIN, OF NEW YORK, N. Y.

PROCESS OF PRODUCING SUGAR-BEARING BODIES.

1,140,353.  Specification of Letters Patent.  Patented May 25, 1915.

No Drawing.  Application filed May 21, 1912. Serial No. 698,685.

*To all whom it may concern:*

Be it known that I, GEORGE HILLARD BENJAMIN, a citizen of the United States, residing at New York city, in the county and State of New York, have invented certain new and useful Improvements in Processes of Treating Sugar-Bearing Bodies, of which the following is a specification.

My invention relates to a process of treating sugar bearing bodies such as the sugar cane, sorghum and beet-root, to bring such bodies into a condition whereby they may be transported over long distances and stored for considerable periods, without appreciable loss of their sugar constituents. Thus I am able to treat sugar cane or sorghum upon the plantation, and beet-roots upon the farm, and then transport these bodies long distances to countries having different climatic conditions, store them, and then treat them, as may be convenient in the operation of the factory. For instance, I may treat sugar cane in Cuba, transport it to America, and separate the sugar from the cane in America; or I may treat beet-root on the farm, then convey the treated beet-root to the conversion factories, store the body for a long period of time, and separate the sugar from the beet-root there, thus avoiding the necessity of freezing the beets and the usual immediate defecation which is necessary, owing to the rapid destruction of the frozen beets by fermentation.

To carry my invention into effect I may proceed as follows:

Example I: Sugar cane, as it is harvested, is sent through a machine and the cane cut into small pieces of about one-half inch in length. As the cane is cut, the juice, which is separated, is allowed to flow into a pan containing a body of phosphate of lime. The body of cut cane as it leaves the cutting machine, is carried to a mixing tank, into which is simultaneously introduced a mixture of phosphate of lime and diatomaceous earth, and from time to time, the sugar which is absorbed by the phosphate of lime in the pans under the cutting machine. The percentage of phosphate of lime and diatomaceous earth introduced, will depend in a large measure upon the percentage of sugar which is carried by the cane. Under ordinary conditions I introduce a mass of phosphate of lime and diatomaceous earth which represents 25% of the weight of the cane, and in which mass the phosphate of lime represents 75% and diatomaceous earth 25%. I do not however, limit myself in any wise to the proportion of the introduced mass relative to the weight of the cane or the percentage of phosphate of lime and diatomaceous earth in the introduced mass, for as before stated, the proportions vary in accordance with the sugar constituents, amount of water, etc., present.

The phosphate of lime may be obtained in the usual manner from any suitable source, as for instance from apatite or coral rock. Coral rock is composed of the following bodies:

| | |
|---|---:|
| Phosphoric acid ($P_2O_5$) | *34.66 |
| Calcium | 31.00 |
| Magnesium | 1.00 |
| Potas | 1.00 |
| Sod | 0.3 |
| Iron oxid | 5.00 |
| Alum. (clay) | 9.00 |
| Sulf. acid | 0.2 |
| Chlor | 0.3 |
| Carb. acid | 2.00 |

Sand, organic substance, and water.

* Equal to $Ca_3(PO_4)_2$, 75.67.

Diatomaceous earth is silica in the form of diatoms. The action of the phosphate of lime upon the sugar juices is to render and keep them neutral, thereby preventing fermentation and inversion. The action of the diatomaceous earth is to absorb any free juices.

After the cut cane has been incorporated with the materials described, the mass can be pressed into packages of any convenient size. Should the mass be soft, it may be dehydrated by passing over it hot air from which the moisture has been extracted. The packages are preferably wrapped in paraffined paper. They may be immersed in a warm solution of paraffin to give them a surface coating, but this is not essential.

Example II: The beet-root is subjected to the usual action of a cutting machine to divide the beet into "cosettes." Any juice escaping in the cutting operation, falls, as in Example I, into a body of phosphate of lime. I prefer to slice the "cosettes" somewhat thinner than is the usual practice. Instead of dividing the beets into "cosettes", they may be ground, in which case I prefer that the juice separated in grinding shall fall into a box containing sufficient of the mixture of phosphate of lime and diatomaceous earth to absorb the juice, so that there shall be no free juice. After the "cosettes" are made, or the beets ground, the separated mass is introduced into a tank, and a body of phosphate of lime and diatomaceous earth, as also the body of phosphate of lime and diatomaceous earth containing the absorbed juice, introduced, and the whole thoroughly mixed. This final body may also be subjected to a dehydrating process if too fluid, then pressed and packed for shipment as in Example I.

The packages formed according to Examples I and II, may be shipped long distances and held for a considerable length of time under extreme atmospheric conditions of heat or cold, without separation or inversion of the sugar juice.

After the packages have been received at the factories, they may be treated as follows: The package or packages are introduced into a blow-up tank and blown up with hot water and steam. The contents of the blow-up tank is then driven through a coarse wire filter, to separate out the woody fiber of the cane, but not to separate out the phosphate of lime or the diatomaceous earth. The magma is then pumped to settling tanks, and if necessary, treated as in sugar refining, after which the juice may be rarefied and conveyed to the vacuum pans. It will be observed that the phosphate of lime will act to separate the albuminous bodies contained in the sugar juices, and that the diatomaceous earth is an efficient filter. In practice it has been found that sugar treated as described, may be refined without the addition of other chemicals, and that it is only necessary, after blowing up and filtering, to send the juice through the charcoal clarifiers before introducing it directly into the vacuum pans. The coarse filtrates, i. e., the desiccated cane, can be treated with water and the sweet waters obtained, subsequently refined. The residual solid matters may be treated to convert the ligneous matter into ash and carbon to form a fertilizer.

In the case of the product obtained from Example II, I prefer to first treat the packages with heated water to soften them, after which the separated material is introduced into the primary cell of a diffusion battery and the process of separation of the sugar carried on as is usual in a diffusion battery. After the preliminary heating by hot water, the material may be filtered to extract as much as possible of the diatomaceous earth. In practice, however, I find that the presence of the phosphate of lime and diatomaceous earth does not interfere with the separation of the sugar juice from the beet cells, as carried out in the usual diffusion process, but on the other hand, rather aids in effecting the diffusion by reason of the fact that these bodies prevent agglutination of the mass in the diffusion cells, and thus promote more free circulation than can usually be obtained.

Having thus described my invention, I claim:

1. The process of treating sugar bearing bodies, which consists in dividing said bodies into small pieces, introducing phosphate of lime in sufficient quantity to neutralize the normal acids and diatomaceous earth in sufficient quantity to absorb any free juices, and finally mixing and pressing the mass to form packages.

2. The process of treating sugar bearing bodies, which consists in comminuting or dividing the body, introducing phosphate of lime in sufficient quantity to neutralize the body and diatomaceous earth in sufficient quantity to absorb any free juices, dehydrating the mass, and finally mixing and pressing the mass to form packages.

3. The process of treating sugar bearing bodies, which consists in separating the sugar bearing bodies into small particles, introducing sufficient phosphate of lime to neutralize the normal acidity of the sugar juices, introducing sufficient diatomaceous earth to absorb any free juices, dehydrating the mass to remove any excess of water, and finally mixing and pressing the mass to form packages.

4. A step in the process of treating sugar bearing bodies, which consists in subjecting the comminuted body to the action of a sufficient amount of phosphate of lime to neutralize the normal acidity of the juices of the sugar bearing bodies.

5. As a new product, a body consisting of comminuted sugar bearing bodies, sugar derived from said bodies, phosphate of lime and diatomaceous earth, all in a dry and solid condition but soluble and separable under the action of heat, water and steam.

6. As a new product, a body consisting of comminuted sugar bearing bodies, sugar bearing extracts from said bodies, phosphate of lime in a soluble condition derived from coral rock, and diatomaceous earth.

7. A step in the process of treating comminuted sugar bearing bodies, which consists in subjecting them to the neutralizing action of a soluble phosphate of lime.

8. The process of treating sugar bearing bodies, which consists in breaking up such bodies, introducing sufficient phosphate of lime to neutralize the normal acidity of the sugar juices, then introducing an absorbent body to absorb any free juices and form a substantially dry body, and finally mixing and pressing the mass to form packages.

In testimony whereof, I affix my signature, in the presence of two witnesses.

GEORGE HILLARD BENJAMIN.

Witnesses:
HELEN E. KOELSCH,
ELI WEILL.

It is hereby certified that in Letters Patent No. 1,140,353, granted May 25, 1915, upon the application of George Hillard Benjamin, of New York, N. Y., the title of the invention was written and printed "Process of Producing Sugar-Bearing Bodies," whereas said title should have been written and printed *Process of Treating Sugar-Bearing Bodies;* page 2, line 40, for the word "rarefied" read *clarefied;* and that the said Letters Patent should be read with these corrections therein that the same may conform to the record of the case in the Patent Office.

Signed and sealed this 22nd day of June, A. D., 1915.

[SEAL.]

J. T. NEWTON,
*Acting Commissioner of Patents.*